April 14, 1964   H. W. KLEIST   3,128,608
AUTOMOTIVE AIR CONDITIONING SYSTEM
Filed Jan. 11, 1962   2 Sheets-Sheet 1

INVENTOR.
Herman W. Kleist,
BY Parker & Carter
Attorneys.

April 14, 1964   H. W. KLEIST   3,128,608
AUTOMOTIVE AIR CONDITIONING SYSTEM
Filed Jan. 11, 1962   2 Sheets-Sheet 2
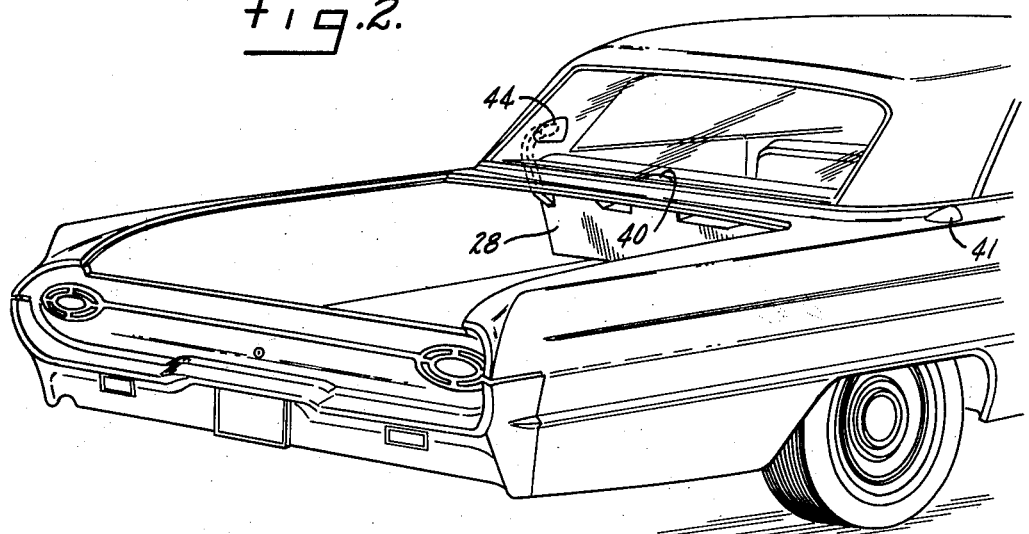
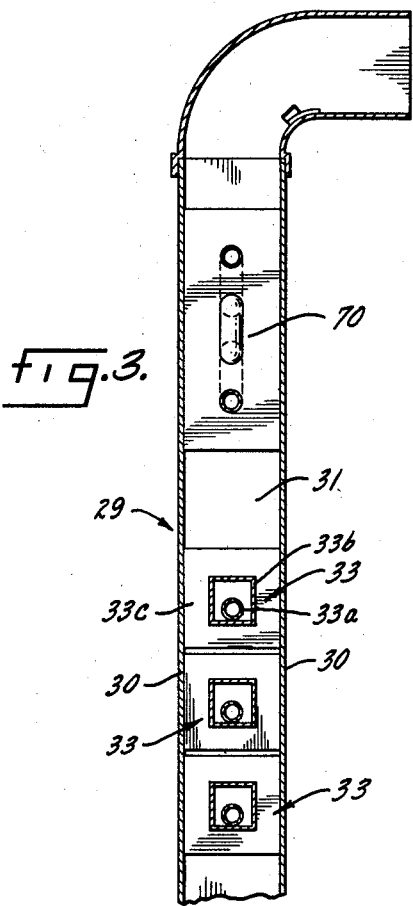
INVENTOR.
Herman W. Kleist,
BY Parker & Carter
Attorneys.

United States Patent Office 3,128,608
Patented Apr. 14, 1964

3,128,608
AUTOMOTIVE AIR CONDITIONING SYSTEM
Herman W. Kleist, Hollywood, Ill., assignor to Dole Refrigerating Company, Chicago, Ill., a corporation of Illinois
Filed Jan. 11, 1962, Ser. No. 165,570
4 Claims. (Cl. 62—243)

This invention relates to an improved automotive air conditioning system. One purpose is to provide an automotive air conditioning system having improved air temperature regulating means.

Another purpose is to provide an improved system of ducting which, together with associated evaporator units, may be positioned in an automobile with a minimum use of space.

Another purpose is to provide such a system which may be inserted in a restricted space, to the rear of the rear seat of an automobile, or immediately forwardly of the instrument panel.

Another purpose is to provide such a system in which heating and cooling units may be associated directly in a single system of ducts.

Another purpose is to provide means for alternatively recirculating inside air or supplying outside air to the air conditioning system of a vehicle.

Another purpose is to provide an efficient light-weight air conditioning system for automotive use, characterized by a combination evaporator and "cold" storage means.

Another purpose is to provide an automotive air conditioning system having improved means for providing a readily regulated temperature in the passenger compartment of an automobile.

Other purposes will appear from time to time in the course of the specification and claims.

The present application is a continuation-in-part of my copending application Serial No. 858,102, filed in the United States Patent Office on December 8, 1959, for "Automotive Air Conditioning System," now abandoned.

The invention is illustrated more or less diagrammatically in the accompanying drawings wherein:

FIGURE 2 is a perspective view of the rear part of a car with my system installed; and FIGURE 3 is a vertical section, taken along the length of the car, through a part of the ducting system used.

Like parts are indicated by like symbols throughout the specification and drawings.

Figure 1:
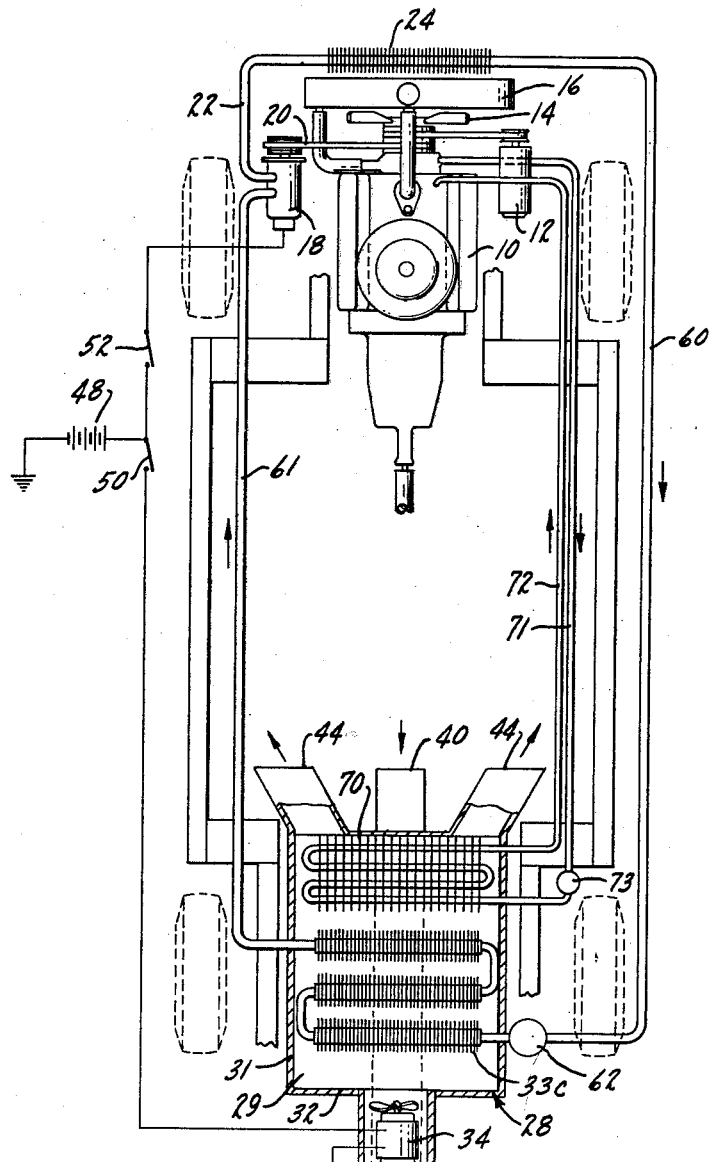
FIGURE 1 is a diagrammatic illustration of my improved automotive air conditioning system.

Referring to the drawings, and, for example, to FIGURE 1, an automobile engine is diagrammatically indicated at 10. Associated with it are a generator 12, a fan 14, and a radiator 16. The details of these elements form, of themselves, no part of the present invention. Associated with the engine is a compressor 18 which may be driven from the engine through a belt 20. The compressor is connected through a duct or pipe 22 with any suitable condenser 24, herein indicated as positioned forwardly of the radiator 16, so that the air drawn toward and through the radiator by the fan 14 will cool the compressed refrigerant supplied to the condenser by the compressor 18.

The system of ducting used is more or less diagrammatically illustrated in FIGURE 1, at 28. As will be shown in FIGURE 2, the system may be understood as having the ducting placed to the rear of the rear seat of the car, in the forward portion of the trunk compartment against a major wall of the trunk compartment. It will be noted from FIGURE 2 that there is a minimum loss of space, and that the ducting assembly 28 is located so far forwardly in the trunk space as to occupy space not normally used. The assembly 28 may include a body portion 29 shown in section in FIGURE 3. It is shown as formed of forward and rear walls 30, side walls 31, and an end wall 32. In the space so formed I position the evaporator elements proper. While the details can be varied, I illustrate, in FIGURES 1 and 3, an evaporator consisting of three elements 33. Each such element 33 includes the evaporator duct or pipe 33a, a surrounding cold storage housing 33b, and a system of parallel fins 33c. It will be understood that the space about the evaporator pipe 33a may be partially or almost wholly filled with any suitable eutectic which freezes at a predetermined temperature. It will be understood that the housing 33b for the eutectic must not be so completely filled as to risk rupture upon freezing. However, it is possible to so gauge the contents that the space about the evaporator pipe 33a, and within the housing 33b, will be substantially filled by a solid frozen block after a predetermined cycling of the compressor. The fins 33c of the units shown are in parallel and are arranged along the axis of flow of air through the body portion or chamber 29. The air to be cooled may alternatively be delivered from within the vehicle or from outside of the vehicle. I more or less diagrammatically show an inside air duct 40 which may receive air from the interior of the car and may conveniently be located immediately behind the rear seat of the car. Any suitable outside air inlet or inlets 41 may be employed, with a suitable connection to the exterior of the car. The details of such connection are not of themselves important. Any suitable shutter or equivalent control 42 may be employed, operated, for example, from the instrument panel by a suitable control cable or Bowden wire or the like 43. Thus the operator may set the shutter 42 to provide a recirculation of inside air or an entry of outside air, or some suitable combination thereof. The cooled air is delivered, for example, by a motor-driven fan unit 34 which is located forwardly of the shutter 42 and, therefore, is operative, regardless of the setting of the shutter.

When the motor operates, a forced feed of air is directed about the eutectic housings 33b and through the fins 33c. This cooled air may be delivered to the interior of the car, for example, by delivery ducts 44. As a matter of illustration, two such ducts may be used, located to deliver to the interior of the car. These ducts are of such dimension and shape as easily to be housed within the body structure or the body lining of the car. Any suitable louvers or air directional means may be employed, the details of which need not herein be shown. The fan unit 34 may be driven, for example, from the automobile battery 48. A switch 50 may be positioned, for example, on the automobile dashboard. A suitable electrically operated clutch for the compressor 18 may similarly be supplied with electric current by the automobile battery 48, and may be controlled by a switch 52 which also may be positioned, if desired, on the automobile dashboard.

It will be understood that the individual units 33 will be suitably connected with the compressor 18. As the compressor 18 delivers liquid refrigerant at high pressure to the condenser 24 it is there liquefied and then flows by the pipe or passage 60 to the first in line of the units 33. The return duct 61 delivers the evaporated refrigerant to the suction side of the compressor 18. 62 diagrammatically indicates a pressure reduction valve, but other suitable pressure reducing means may be employed.

It may be advantageous to provide heating means for heating the outside or recirculated air, either as a substitute for the cooling system or in cooperation with it. I therefore illustrate a finned heating coil 70 which is shown in FIGURES 2 and 3 on the air delivery side of the cooling units 33. It may be placed in circuit with the fluid cooling system of the engine by any suitable ducts 71, 72. A thermostat 73, or equivalent unit, sensitive to the temperature of the air in the passenger compartment of the automobile, is indicated. As an example of a convenient control, when the temperature reaches a pre-selected point, where the air is too cold to be comfortable, the thermostat 73 will open the duct 71 and permit hot water to flow to the heating unit 70.

It will be realized that, whereas, I have described and illustrated a practical and operative device, nevertheless many changes may be made in the size, shape, number and disposition of parts without departing from the spirit of my invention. I therefore, wish my description and drawings to be taken as in a broad sense illustrative of diagrammatic, rather than as limiting me to my precise showing.

The use and operation of the invention are as follows:

In solving the problem of air conditioning a vehicle, such, for example, as an automobile, one primary factor is the ability to maintain a continuous supply of cold air, regardless of whether the vehicle is in motion or not. Another primary factor is the importance of being able to provide a source of stored cold which is of such size and shape as to be efficiently positioned or located in the vehicle with a minimum loss of utilizable space. Another factor is the provision of a flexible system in which the degree of cooling effect can be controlled. In the illustrated embodiment of my invention I provide a cooling assembly in which any desired number of cooling finned coils, each with its cold storing feature, may be positioned in the line of flow of air to the entry of the vehicle. As shown in the drawings herein I illustrate a relatively flat passage, or a passage assembly, 28, 29, which has a substantial lateral extension but is shallow in depth. Thus it may efficiently be inserted in the trunk immediately behind the rear seat of the car. Similarly, it may be inserted in the front of the car immediately forwardly of the instrument panel. It may even be so proportioned as to be inserted elsewhere in the walls or roof of a car, between an outer and inner wall or roof member. However, the arrangement shown in FIGURE 2 is, in practice, very practical, since the cooling assembly is positioned at the far forward end of the trunk space and thus provides a minimum interference with or loss of trunk storage space.

The user may selectively recirculate inside air or draw in outside air. Through the relatively flat passage assembly 28 he can also, if desired, supply heated air. That is to say, either by a suitable manual or by a thermostatic control 73 a heated fluid may be supplied to the heating coil 70. It will be understood that a suitable air circulating fan may be controlled, for example, by the switch 50. Likewise, the operation of the compressor may be controlled, for example, by the switch 52. It will be understood, of course, that either or both of these switches may also be thermostatically controlled in response to changes of temperature within the space to be heated or cooled. It will be understood, also, that the number of the cooling and cold storing units 33 may be varied to suit the particular job. The result is a simple, rugged and lightweight evaporator unit which includes a cold storage feature or means for circulating cold, and yet which may be positioned at a variety of locations in a vehicle, with a minimum use of space. The regular cycling of the cooling system serves to build up stored cold in the form of ice in the compartments 33b. At high engine speeds excess cold will be stored sufficient to freeze the eutectic substance or medium surrounding the tubes or evaporator elements 33a. The fins of the units 30 are preferably aligned with the axis of flow of air, and the air is cooled by the heat transfer action of the fins as well as by contact with the exterior of the eutectic-filled housings 33b. At low engine speeds, or during short stoppages, the eutectic material in the containers 33b will be sufficient to provide a continuous supply of cold air.

As the refrigeration system shown herein may be continuously driven without regulation it is necessary to provide a means of heating the air when it is cooled to too low a temperature. I have provided a heating coil, which may take a variety of forms, in the air circulating passage beyond the cooling means, which, in effect, regulates the temperature of the cold air. A thermostat, which may be conveniently within the passenger compartment of the automobile, controls the amount of hot water supplied to the heating coils. When the engine is running at a high speed and the air has an uncomfortably low temperature, the heating coils will warm the cooled air to a satisfactory temperature. Thus is provided an air conditioning system wherein the cooled air is always at a prescribed satisfactory temperature. It should be noted that the heating coils are separate and apart from the evaporator and eutectic material so that none of the heat coming therefrom will in any way affect the eutectic. Also, the circulating air is always blown over the heating coils after it has passed the evaporator.

Of particular note in my invention is the compact combination evaporator and eutectic cold storage means which is placed in the path of the circulating air. The evaporator may be simply constructed of sheet metal or otherwise to form a rugged, efficient compact unit.

Whereas only one fan has been shown in the drawings as a source of power for circulating the air through the system, it should be realized that one or more fans may be suitably placed to drive air through the air circulation passages. Also, when the auto stops the eutectic still provides cooling, as long as the fan 34 is operating. The invention has been described as being generally applicable to an automobile; however, it should be understood that the invention is equally applicable to any type of vehicle.

I claim:

1. In an automotive vehicle having an interior enclosure, a variable speed power plant, and an auxiliary compartment, a system for maintaining the interior enclosure below ambient temperature during periods of idle and shutdown of the vehicle's variable speed power plant, said system including, in combination, a compressor, a direct driving connection adapted for connection to the vehicle's variable speed power plant and the compressor, the compressor thereby being adapted to be driven at a speed in consonance with variations in speed of the vehicle's power plant, said compressor thereby being adapted to be shut down during periods of shut down of the vehicle's power plant, a refrigerant condenser, an evaporator comprising a plurality of overlapping runs, and refrigerant circulant lines connecting the condenser, evaporator and compressor in a closed circuit, said evaporator being spaced substantially parallel to an adjacent surface in the auxiliary compartment, said evaporator being substantially longer and wider than it is thick and being closely spaced to the adjacent surface with the thickness dimension being substantially perpendicular to the adjacent surface, structure forming a substantially impervious, confined, air flow path having an inlet and outlet, said evaporator being located in the air flow path structure intermediate its inlet and outlet, air circulating means located on the inlet side of the evaporator and being positioned to move air from the inlet across the evaporator, liquid tight eutectic housing means associated with the evaporator runs, the air flow path structure being relatively thin and having its largest opposed walls substantially parallel to one another, said air circulating means being operable by a power source independent of the vehicle's power plant to move air across the eutectic housing means whereby said air circulating means may operate during periods of shut down of the vehicle's power plant and consequently the refrigerant flow is minimal or lacking, the cooling effect of air drawn into the vehicle's interior being thereby provided by the stand-by cooling effect of the eutectic completely independently of the operation of the compressor or vehicle power plant.

2. The apparatus of claim 1 further characterized in that the auxiliary compartment is the luggage compartment, the evaporator being closely spaced to the major wall of the compartment closest to the air flow path outlet.

3. The apparatus of claim 1 further characterized in that the eutectic housing means comprises a plurality of liquid tight eutectic housing, one for each evaporator run, each evaporator run being located within an associated eutectic housing, the eutectic therewithin thereby being in intimate heat exchange relationship with the evaporator run.

4. The apparatus of claim 3 further characterized by and including a plurality of fins for each eutectic housing, said fins terminate short of the fins on each adjacent eutectic housing in the direction of air flow to thereby provide maximum heat exchange for each eutectic housing.

the evaporator runs being substantially parallel to one another and the fins being of substantially uniform width.

the air flow path structure having its major walls spaced apart substantially the width of the fins whereby it may be placed substantially flush against a plane surface such as the rear wall of a seat in the vehicle.

References Cited in the file of this patent

UNITED STATES PATENTS

| | | |
|---|---|---|
| 2,155,278 | Mautsch | Apr. 18, 1939 |
| 2,735,657 | Owen | Feb. 21, 1956 |
| 2,773,360 | Baker et al. | Dec. 11, 1956 |
| 2,795,114 | Kleist | June 11, 1957 |
| 2,884,768 | Gould | May 5, 1959 |
| 2,922,290 | Carraway | Jan. 26, 1960 |
| 3,059,449 | Dilliner | Oct. 23, 1962 |